INVENTOR
ROBERT A. KOLPEK

BY D. Kendall Cooper

ATTORNEY

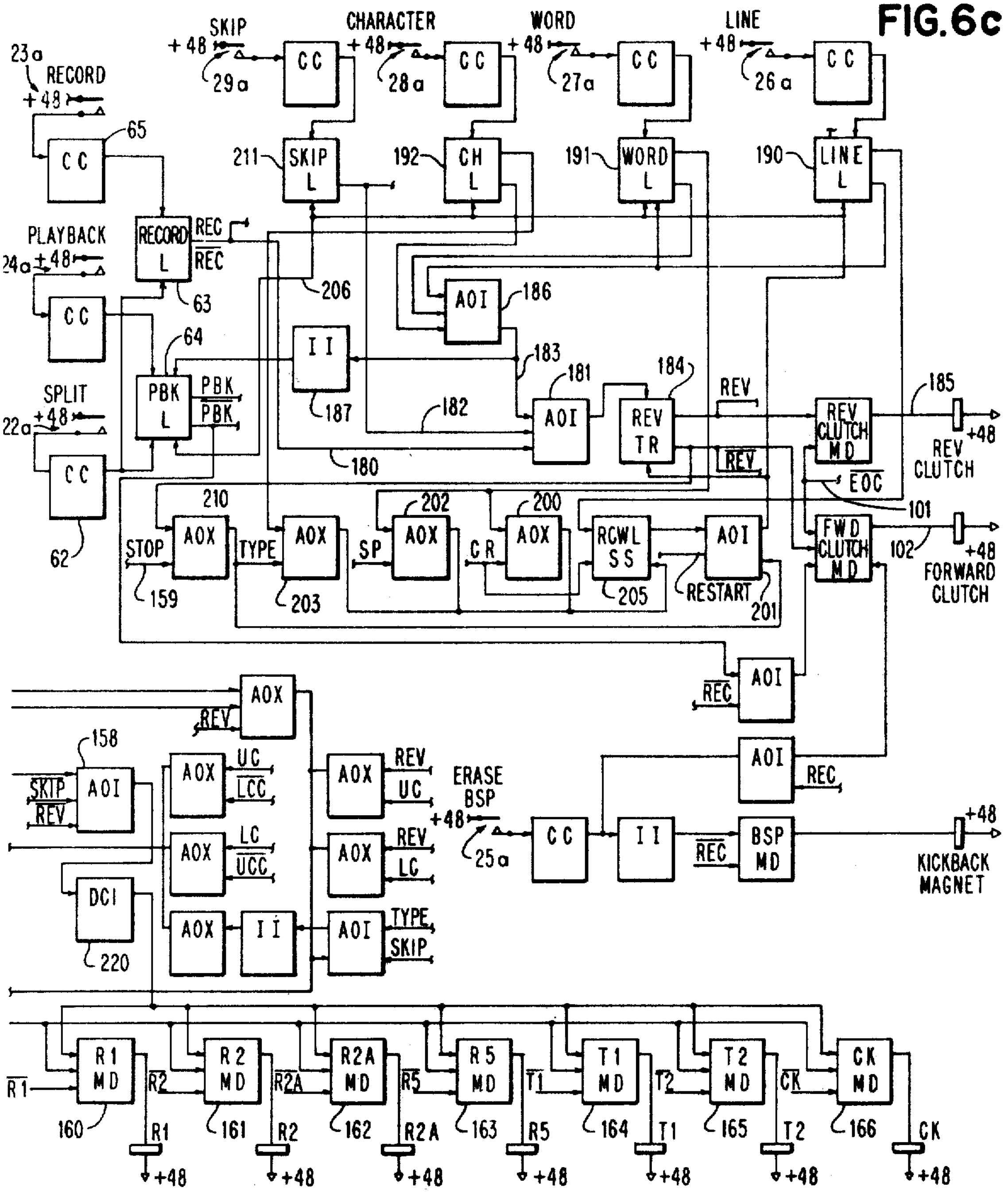
FIG. 6c
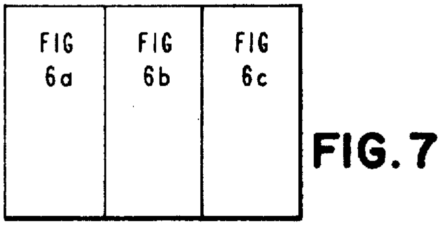
FIG. 7
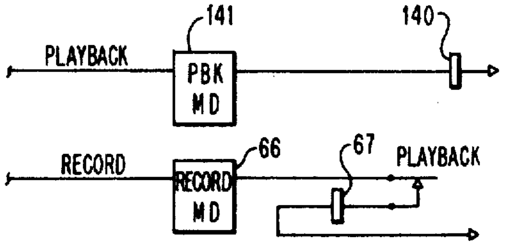

United States Patent Office 3,528,063

Patented Sept. 8, 1970

3,528,063

RECORDING AND REPRODUCING APPARATUS WITH FACILITIES FOR LOCATING INFORMATION IN RECORD MEDIA

Robert A. Kolpek, Lexington, Ky., assignor to International Business Machines Corporation, Armonk, N.Y., a corporation of New York Original application June 30, 1965, Ser. No. 468,386, now Patent No. 3,417,202, dated Dec. 17, 1968. Divided and this application Dec. 6, 1968, Ser. No. 781,804

Int. Cl. G05b *11/01;* G11b *5/62*

U.S. Cl. 340—172.5 17 Claims

ABSTRACT OF THE DISCLOSURE

The apparatus includes a printer and a magnetic recorder unit that are arranged in connection with auxiliary control apparatus for independent operation as a printer and an audio dictation unit, respectively, in one mode of operation, and for the recording and reproducing of digital data representing printed characters on the typewriter, in an other mode of operation. Facilities are provided for locating data in a record media as follows.

When in a Record mode, if a "Line" button is depressed, the recorder reads characters of information on the media in a reverse direction. No printing takes place, but when a Carrier Return code is encountered, the printer performs a Carrier Return operation to the next line on a document in the printer. As each character is read, the printer is backspaced. However, a Backspace character causes the printer to space to maintain synchronism between the printer and recorder unit. When a Playback button is depressed, depression of the Line button results in movement of the media in a forward direction during which time characters of information are read for printing by the printer. A similar operation occurs for data "words," and "characters."

The present case is a divisional case of application Ser. No. 468,386, now U.S. Pat. No. 3,417,202, entitled "System for Recording, Reproducing and Communicating Digital and Audio Signals With Control Adjuncts for Operator Use," filed June 30, 1965.

BACKGROUND OF THE INVENTION

The requirements of modern day business have led to the development of many types of equipment for initially preparing or reproducing documents such as letters, invoices, and other documents. Most offices today have a wide variety of specialized equipment for performing these functions. As an example, typewriters are provided for typing original documents together with carbon copies, as required, and for preparing drafts of material transcribed from shorthand notes or from material dictated on record media. Dictating machines are useful for recording letters and other documents or for recording conference proceedings on record media, such as magnetic belts. With proper attachments, dictating equipment can be used for transcribing previously dictated material by a typist who listens to the material and concurrently types a draft or finished letter from the same.

In addition to typewriters and dictating units, a number of units have been developed for operation in conjunction with a typewriter for recording information digitally as it is typed, and subsequently reading the recorded digital signals to prepare additional documents automatically. Such equipment speeds up the document preparation process and provides considerable flexibility in correcting errors or making deletions and insertions in the originally recorded material. In some cases, when a company has a number of operating plants or offices located some distance apart, such as in different cities, it is expedient to transmit digital data from one location to another to apprise management of latest production statistics, sales figures, and similar matters concurrently with the preparation of original documents at the source location.

Business requirements, such as those mentioned, have led to the development of highly complex and specialized apparatus for handling all of the operations involved.

OBJECTS

Accordingly, an object of the invention is to provide apparatus of simplified nature for handling a wide variety of operations.

Another object of the invention is to provide apparatus that may be used in one mode for a number of separate operations, if desired, and in another mode for concurrent interacting operations, as circumstances require.

A further object of the invention is to increase the range of usefulness of standardized office equipment with a relatively minimal amount of controlling adjuncts.

Still another object of the invention is to provide office equipment that is capable of independent or conjoint local operation or that serves as a transmitting or receiving terminal in a communication environment for recording or printing digital data.

Also, an object of the invention is to provide office equipment that is useful in a digital data transmission environment and in which the data is in a form that can be processed during recording and reproduction without the necessity for complex serializing and deserializing techniques.

A further object of the invention is to provide office equipment that performs complex operations with a minimum of attention on the part of the operator but which also has a number of operator controls for insuring flexibility, according to the requirements of the operation.

Still another object of the invention is to provide recording apparatus with provision for locating or skipping predefined quantities of information, for effecting corrections, additions, or deletions in the recorded material.

An additional object of the invention is to supply printing apparatus that is useful in one mode for preparing printed office documents under operator control, and that is useful in another mode for controlling an associated apparatus for automatically recording or printing digital data.

In order to accomplish these and other objects of the invention and according to one embodiment, an office typewriter (printer) and a magnetic recorder unit are arranged in connection with auxiliary control apparatus for independent operation as a typewriter and a dictation unit, respectively, in one mode of operation, and for the recording and reproduction of digital data representing printed characters on the typewriter, in another mode of operation. In another embodiment, typewriter-magnetic recorder unit combinations are arranged in a communication network for the transmission and reception of digital data for recording and/or printing at one end of a transmission line in response to printing of information or reading of previously recorded information at the other end of the transmission line.

In addition, a number of control adjuncts are provided for the operator of the equipment in order to effect recording and playback of digital data, to facilitate correction, addition, or deletion of material, and to otherwise provide flexibility of operation of the equipment under manual operator control.

Also, provision is made for converting printer compatible codes to pulse code configurations in the recording unit that are readily transmittable in their normal form, thereby minimizing the necessity for complicated serializing and deserializing equipment during transmission of data.

The foregoing and other objects, features and advantages of the invention will be apparent from the following more particular description of the various embodiments of the invention as illustrated in the accompanying drawings.

In the drawings:

FIGS. 1A and B represent a variety of equipment configurations in which the invention may be incorporated, including typewriters, magnetic recorder units, and communication equipment.

Figure 1:
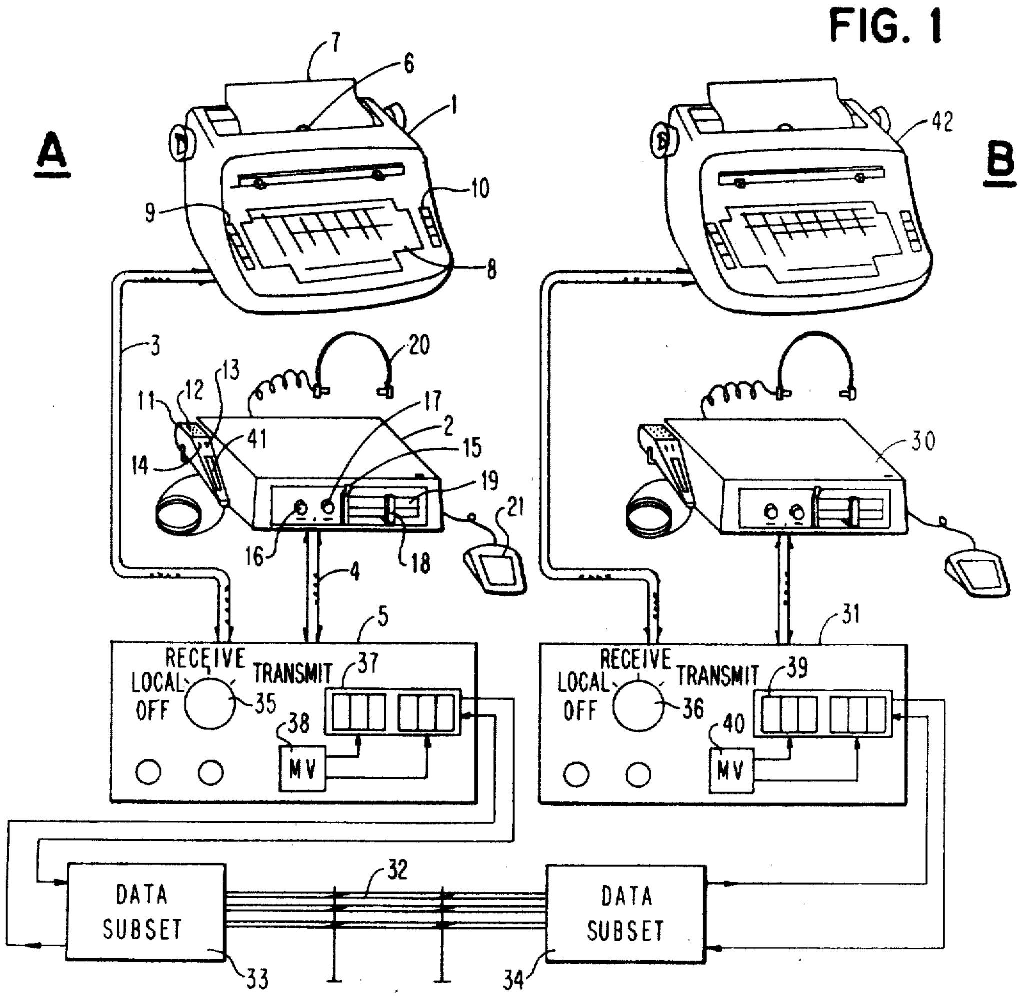
Figure 6A:
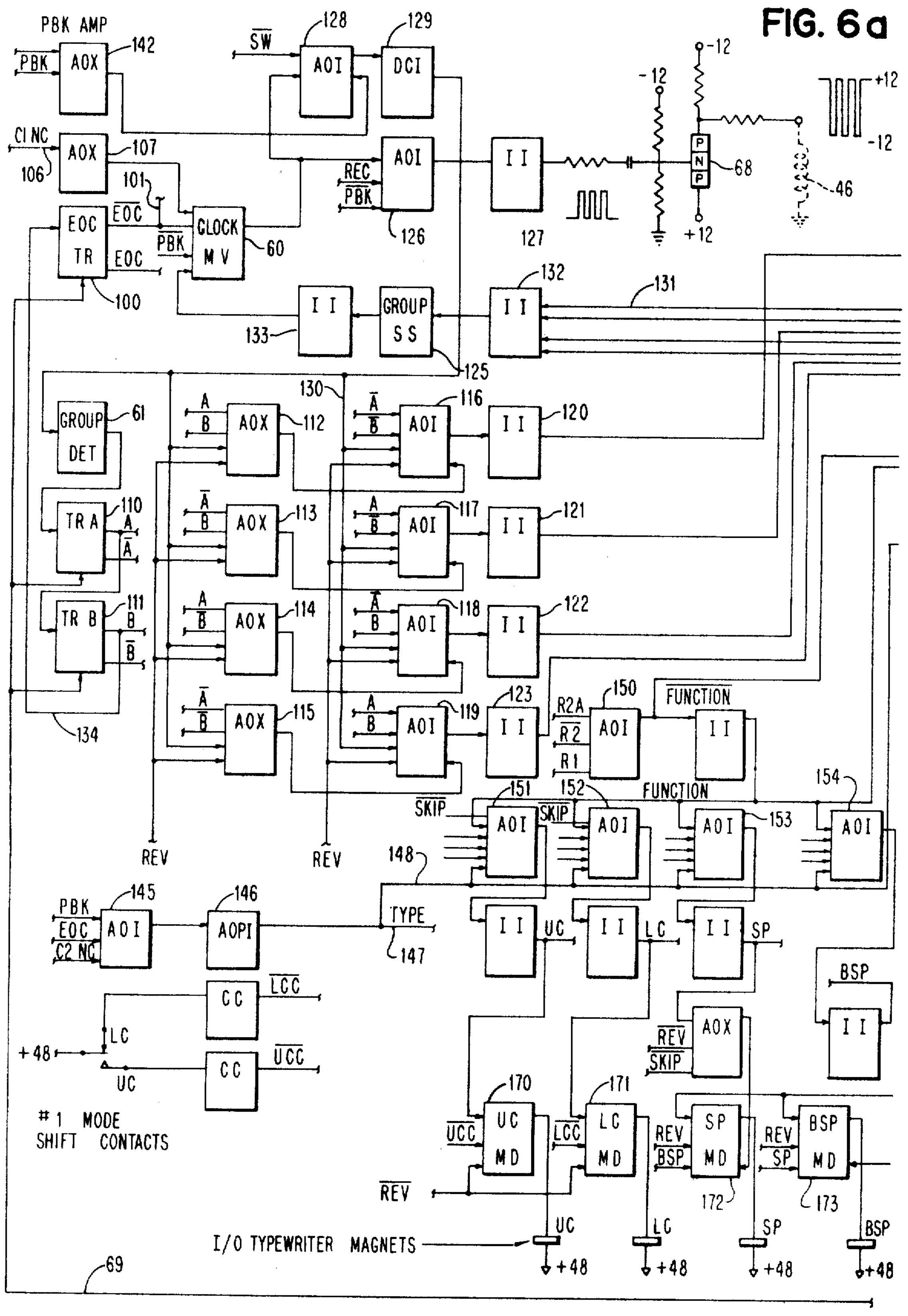
Figure 6B:
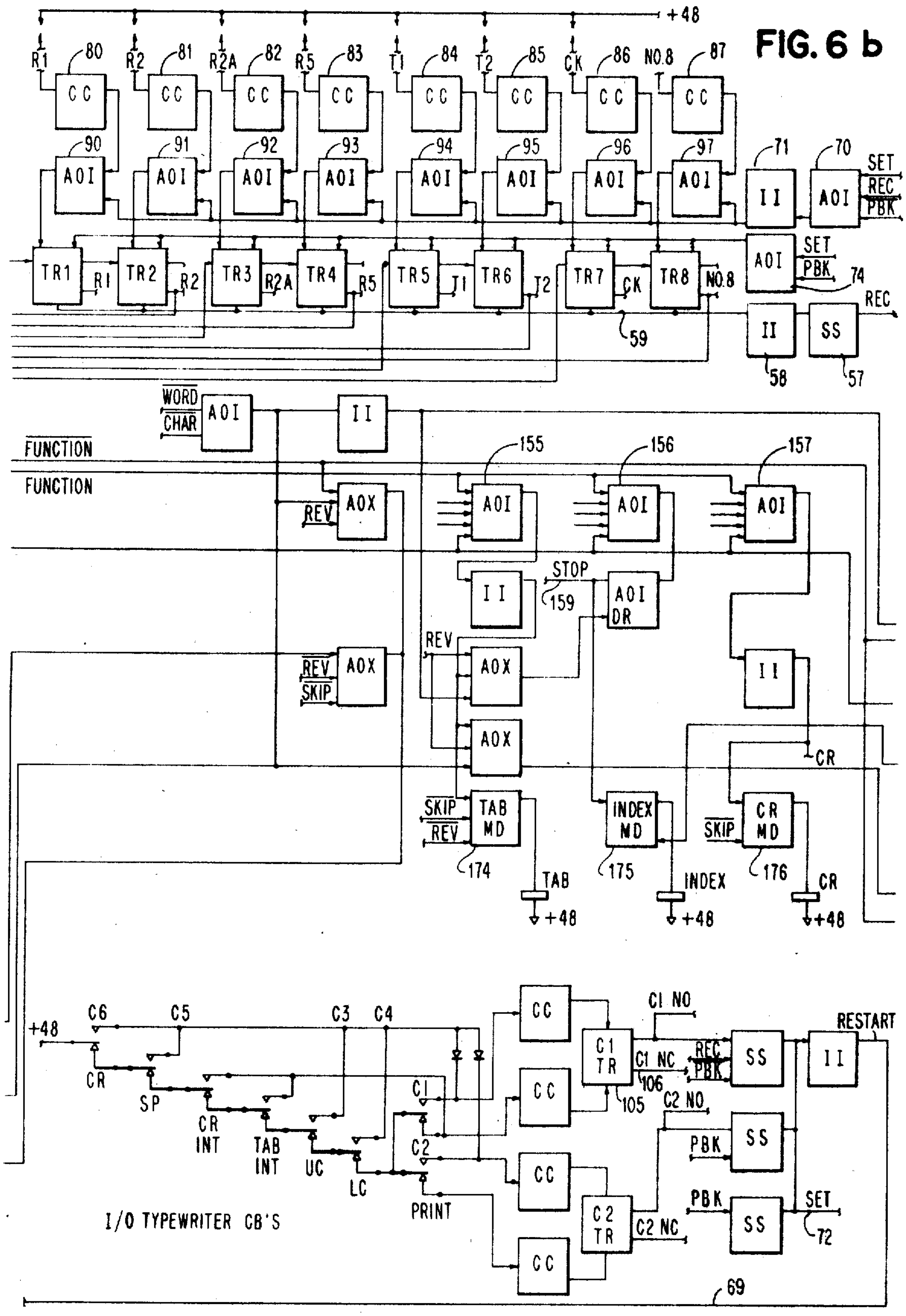

FIGS. 6*a*, 6*b*, and 6*c*, when arranged as shown in FIG. 7, represent circuitry for establishing a number of modes of operation in the equipment of FIG. 1.

Figures 8, 9:
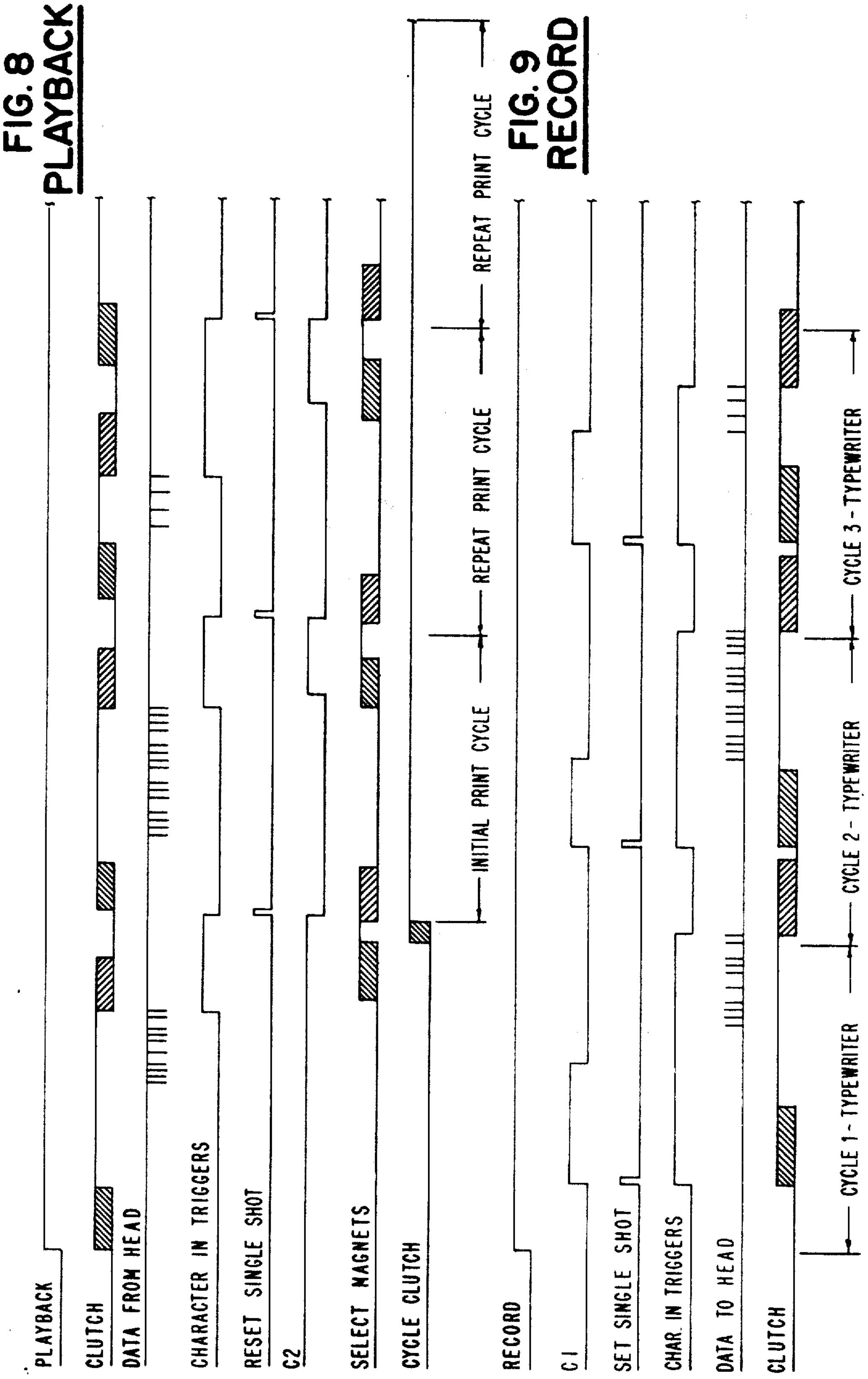

FIG. 8 illustrates timing sequences and waveforms encountered during playback of digital information in the equipment of FIG. 1.

FIG. 9 illustrates timing sequences and waveforms occurring during the recording of digital information in the apparatus of FIG. 1.

INTRODUCTION

In FIG. 1, a first embodiment of the invention is designated terminal A and includes a printer 1 and a magnetic recorder unit 2 that are interconnected by cables 3 and 4, respectively, with a control unit 5. Printer 1 has a single element print head 6 that is selectively actuated for printing characters on a document 7 either under control of depression of keys on a keyboard 8, or in accordance with digital information recorded in recorder unit 2. Printer 1 also has a left bank of keys 9 and a right bank of keys 10 that are shown in detail in FIG. 2, for controlling operations of the equipment. Recorder unit 2 has an associated microphone handset 11 with transducer 12, mode button 13, and indexing button 14. Handset 11 is used during normal dictation for controlling operation of recorder unit 2. Recorder unit 2 makes use of endless loop magnetic belts that are loaded and unloaded under control of a belt release lever 15. Unit 2 also has a volume control 16 and a tuning or tracking control 17. An index assembly 18 is operative to perforate an index slip 19 with end of letter and instruction perforations under control of button 14. During transcription of previously dictated material, a headset 20 is inserted and unit 2 is controlled by a foot control 21.

In the first embodiment, terminal A is capable of several modes of operation. When the Split button 22, FIG. 2, is depressed, printer 1 operates in a conventional manner as an office typewriter and recorder unit 2 is capable of separate operation as a dictation or transcription unit.

Figure 2:
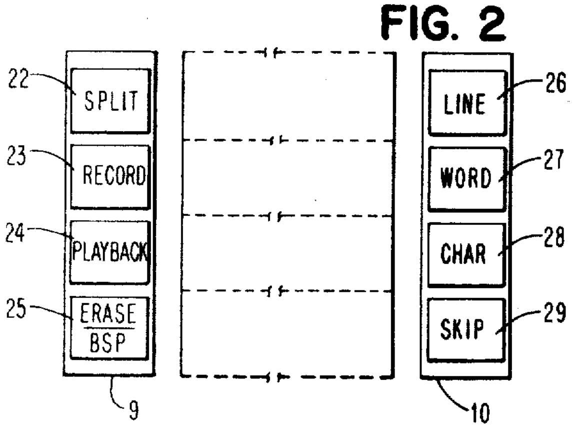
FIG. 2 represents control buttons provided on the printers in FIG. 1.

Depression of Record button 23, FIG. 2, establishes a mode of operation in which actuation of any key on keyboard 8 effects printing on document 7 and also effects recording of a digital character, corresponding to the character selected, on the magnetic record media in recorder unit 2.

Depression of Playback button 24, FIG. 2, establishes circuit operation for reading previously recorded digital data from the magnetic record media in recorder unit 2 and printing information automatically by printer 1 in response to signals developed during the reading operation.

Printer 1 has an Erase-Backspace button 25 and other buttons including Line button 26, Word button 27, Character button 28, and Skip button 29 that are useful in controlling operations of the equipment during Record and Playback modes.

A second embodiment of the invention includes the equipment of terminal A and additional equipment designated terminal B that includes a printer 42, recorder unit 30, and control unit 31. In the second embodiment, terminals A and B are connected by a transmission line 32 through data subsets 33 and 34 for transmission and reception of digital data. Control units 5 and 31 have control knobs 35 and 36 with designations as shown for knob 35 in FIG. 3. Either knob, such as knob 35, is movable to one of three positions designated Local, Transmit, or Receive. When the knobs are in Local position, either terminal A or B is operable as discussed in connection with terminal A previously, and independently of the transmission facilities 32. In order to transmit digital data from terminal A to terminal B, knob 35 is set to the Transmit position and knob 36 is set to Receive position. The transmission of data from terminal B to terminal A is effected by setting knob 36 to Transmit and knob 35 to Receive.

Control unit 5 has a data register 37 and associated multi-vibrator (MV) 38 for handling characters of information and functional characters during digital transmission and reception. Control unit 31 has a similar data register 39 and associated multi-vibrator 40. Registers 37 and 39 are not used in local operation.

Figure 4:
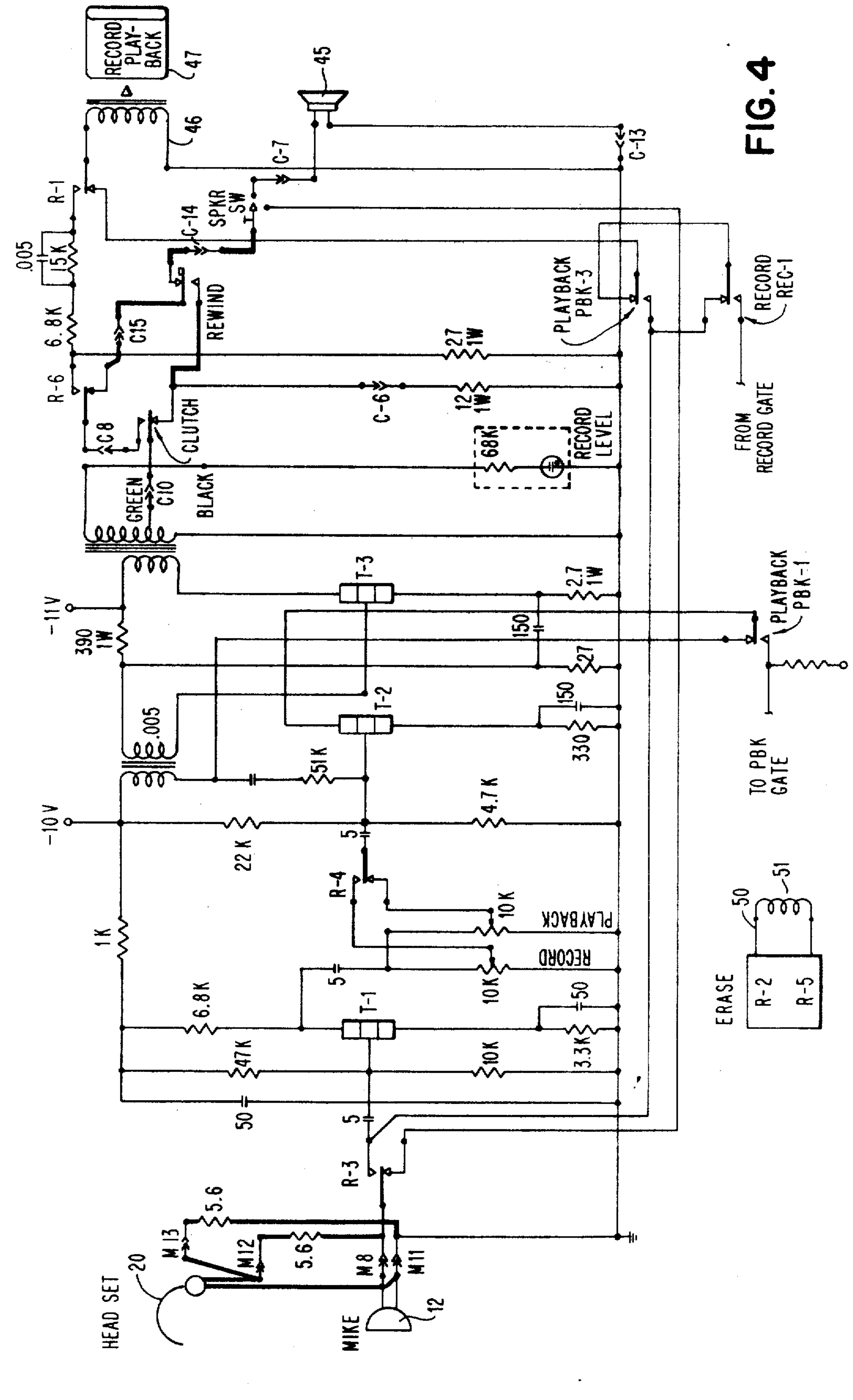
FIG. 4 represents transducers and amplifying circuitry for the recorder units in FIG. 1.
Figure 5:
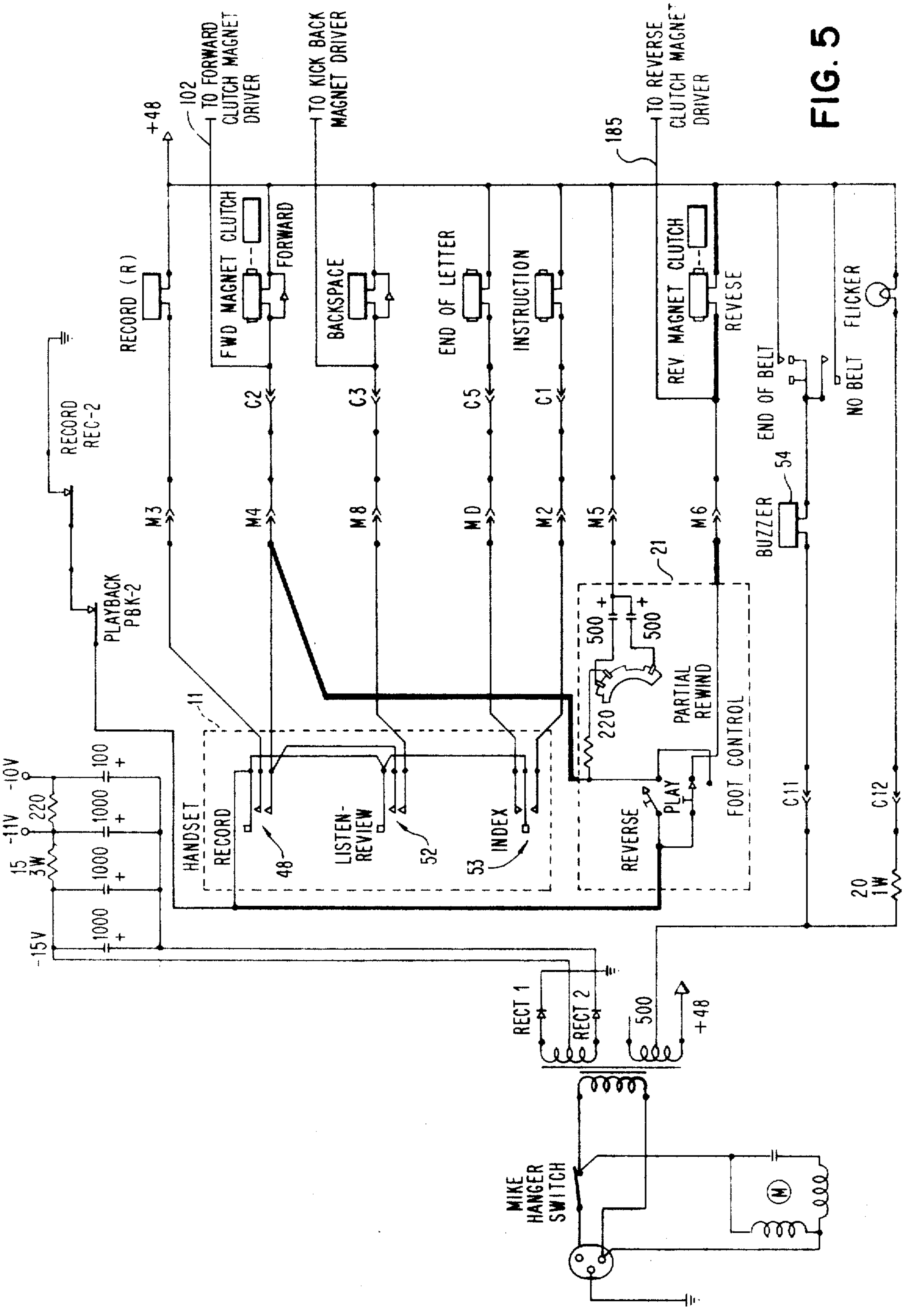
FIG. 5 illustrates a number of control circuits for the recorder units in FIG. 1.

In the system configuration of FIG. 1, printers 1 and 42 have comparable printing and control capabilities, and recorder units 2 and 30 are also capable of comparable functional or control operations. Certain portions of the circuitry for printers 1 and 42 are shown in FIGS. 6*a*, 6*b*, and 6*c*. The circuits for recorder units 2 and 30 are shown in FIGS. 4 and 5. The circuits in control units 5 and 31 comprise the greater portion of FIGS. 6*a*, 6*b*, and 6*c*.

The mechanical and electrical characteristics of printers 1 and 42, recorder units 2 and 20, and control units 5 and 31 will first be discussed followed by a description of the various modes of operation of the first and second embodiments.

ABBREVIATIONS

For convenience, the following abbreviations are used in the present application:

| Abbreviation | Definition |
|---|---|
| AMP | Amplifier |
| AOI | And-Or-Invert |
| AOPI | And-Or-Power-Invert |
| AOX | And-Or-Extend |
| BSP | Backspace |
| C1 | Circuit Breaker No. 1 |
| C1 NO | Circuit Breaker No. 1 Open |
| C1 NC | Circuit Breaker No. 1 Closed |
| C1 TR | Circuit Breaker No. 1 Trigger |
| C2 | Circuit Breaker No. 2 |
| C2 NO | Circuit Breaker No. 2 Open |
| C2 NC | Circuit Breaker No. 2 Closed |
| C2 TR | Circuit Breaker No. 2 Trigger |
| CC | Converter Circuit |
| CHAR | Character |
| CLOCK MV | Clock Multivibrator |
| CR | Carrier Return |
| DC 1 | Direct Coupled Inverter |
| EOC TR | End of Character Trigger |
| FWD | Forward |
| GROUP DET | Group Detector |
| GROUP SS | Group Single Shot |
| I I | Isolating Inverter |
| INT | Interlock |
| L | Latch |
| LC | Lower Case |
| LCC | Lower Case Contact |
| MD | Magnet Driver |
| PBK | Playback |
| R | Record Relay |
| R–1, R–2 etc. | Record Relay Contacts 1, 2, etc. |

| Abbreviation | Definition |
|---|---|
| RCWL | Reset Character, Word, Line |
| REC TR | Record Trigger |
| REV | Reverse |
| SP | Space |
| SS | Single Shot |
| T–1 | Transistor 1 |
| T–2 | Transistor 2 |
| T–3 | Transistor 3 |
| TAB | Tabulate |
| TR | Trigger |
| TR A | Trigger A |
| TR B | Trigger B |
| UC | Upper Case |
| UCC | Upper Case Contact |

RECORDER

Detailed circuits that apply to either of the recorder units 2 or 30, FIG. 1, are shown in FIGS. 4 and 5. The recorder units 2 and 30 are not shown in every detail, but are generally comparable to the dictation recording equipment disclosed in U.S. patent application Ser. No. 216,261, entitled "Multiple Station Selection System" with N. J. Albanes and M. P. Langendorf as inventors, filed Aug. 10, 1962, and assigned to the same assignee as the present invention. The basic equipment is also fully described in the IBM Customer Engineering Manual "Dictation Equipment" Form No. 241–5071, revised Oct. 5, 1962, and also the IBM Dictation Equipment Reference Manual, Form No. 241–5132, dated Oct. 22, 1962.

NORMAL DICTATION OR TRANSCRIPTION

While the circuits of FIGS. 4 and 5 apply to both of the recorder units 2 and 30, for purposes of discussion, it will be assumed that they relate particularly to recorder unit 2. FIG. 4 is primarily concerned with the amplifier circuits of unit 2. FIG. 4 includes a microphone transducer 12 that is incorporated in the handset 11 shown in FIG. 5, and that serves as a transducer during recording and reproduction of signals. Alternatively, a loudspeaker 45 can be switched into the circuit for reproduction of signals. Mode button 13 has three positions designated Record-Listen-Review. Index button 14 has several positions designated Letter-Off-Secretary (Instruction). Switches corresponding to the several positions of the control buttons on handset 11 are shown in FIG. 5.

The recorder unit has a combination record-playback head 46 that cooperates with a magnetic belt 47, FIG. 4, for recording and reproducing signals.

In order for the recorder unit to be operated for recording and reproduction of audio signals, the Split button 22 on printer 1 is depressed. This button operates circuits in FIG. 6*c* to set up printer 1 and dictation unit 2 for separate operation.

To record material on belt 47, mode button 13 is moved to the Record position. Whenever the dictator wishes to dictate material, he depresses a dictate bar 41 on microphone 11 which closes contacts 48, FIG. 5. This energizes the Record (R) magnet and also energizes the Forward magnet to engage the forward clutch 49, thereby moving belt 47 past head 46. Energization of Record relay (R) transfers associated contacts R–1 through R–6. Contacts R–2 and R–5 are used in the erase circuit 50, FIG. 4, to develop an erase signal for head 46 through winding 51. Contacts R–1, R–3, R–4 and R–6 are used in the amplifier circuits of FIG. 4 to establish circuit paths for applying signals developed in transducer 12 during dictation to head 46 for recording on belt 47. The amplifier circuits include transistors T–1, T–2, and T–3.

To review previously dictated material, the dictator moves mode button 13 to the Review position which closes contact 52, FIG. 5. This drops Record relay R and energizes the Backspace magnet to effect backspacing of head 46 with respect to magnetic belt 47. Mode button 13 is spring loaded to a position during which the Forward drive magnet is energized and the forward clutch is engaged for developing signals from magnetic belt 47 by head 46. Since Record relay R is not energized at this time, contacts R–1 through R–6 are in the positions shown in FIG. 4, and connections are established in the amplifier circuits for amplifying signals developed in head 46 and supplying them to transducer 12 for listening by the dictator. If desired, the dictator can place the equipment in a Record mode and replace the previously dictated material with new material by erasing the previously dictated material and concurrently dictating new material.

Index button 14, FIG. 1, serves to operate contacts 53, FIG. 5, in one direction energizing an End of Letter solenoid to perforate index slip 19, FIG. 1, and in the other direction to energize an Instruction solenoid to perforate index slip 19 in a different channel.

In order to transcribe previously dictated material, headset 20, FIG. 4, and foot control 21, FIG. 5, are connected with recorder unit 2 instead of handset 11. The various operations of the recorder unit are then under control of the foot control which enables the transcriber to playback previously recorded material while operating the typewriter manually to prepare a draft. Foot control 21 controls a Reverse (REV) magnet and Reverse clutch shown in FIG. 5 which reverses the movement of belt 47 so that head 46 scans along the recorded helical path in the reverse direction rather than moving head 46 incrementally track by track as happens when the backspace magnet, FIG. 5, is energized during dictation of material.

In the Albanes et al. application and the IBM manuals, in order to effect a reverse operation, the forward magnet and reverse magnet are both energized concurrently. In the present apparatus, for simplicity of wiring, the forward and reverse magnets and their associated clutch mechanisms are preferably operated independently in order to effect the desired direction of drive.

A buzzer 54, FIG. 5, supplies warning signals in the event no belt is in the equipment or the end of belt has been reached.

PRINTING APPARATUS

Printers 1 and 42 are generally of the type disclosed in U.S. Pat. 2,919,002 to L. E. Palmer—Selection Mechanism for a Single Printing Element Typewriter and as fully described in the IBM Instruction Manual, Form No. 241–5032, dated April 1964. The printers are further modified for input/output operation as taught in U.S. Pat. 3,082,854—F. E. Becker—Typewriter Input Checking Mechanism and as further described in the IBM Manual of Instruction, Form No. 241–5159, dated 1965, and the IBM Reference Manual, Form No. 225–1726, dated 1962.

The Palmer patent describes a typewriting printer having a single element print head with all characters of a typefont located on the surface of the head. The head, such as head 6, FIG. 1, is mounted on a carrier for movement in a path adjacent to and in parallel relation with respect to the platen which remains stationary, except for line spacing operations.

A character in such a printer is selected by tilting and rotating the single element print head in response to depression of one of a plurality of keylevers, each keylever being assigned to a character on the head. The keylevers selectively actuate a displacement mechanism having two principal portions, one for tilting and another for rotating the printing head. More specifically, selecting links are operated which determine the pivot points of connecting members to produce an output of predetermined displacement and direction. In each portion of the displacement mechanism, the value of the output is determined by the links selected, either singly or in combination. Following selection, the printhead is actuated against the document, such as document 7, FIG. 1, to effect printing of the selected character. The keyboard 8 of printer 1, as well as the corresponding keyboard of printer 42, has keybuttons for selecting individual characters for printing as well as effecting various functions in the printer. The functions provided for include Shifting from upper case to lower case and vice versa, depending upon the character selected, Spacing, Backspacing, Carrier Return, Tabulate and Indexing. During a Carrier Return operation, the platen and document are spaced one line space in order to place the print head in position for printing on a new line. An Indexing operation normally effects a line space of the platen without a Carrier Return operation. However, in the present apparatus, depression of the Index button merely cycles the printer, and the action develops a code combination that is designated Stop code.

Depression of a character key on keyboard 8, FIG. 1, causes movement of an associated interposer to the rear of printer 1. The details of hardware and operation of the printer are covered in the aforementioned Palmer and Becker patents and the IBM Manuals. Movement of an interposer to the rear effects movement of selector bails in various combinations depending upon the interposer that has been moved. Movement of any interposer also effects movement of a cycle bail which through various linkages, releases a cycle clutch in the printer and subsequently rotates a filter shaft to print the selected character.

Depending on the interposer that is moved to the rear of the printer, various combinations of the selector bails are moved toward the front of the printer. There are five selector bails that operate associated latch interposers which are utilized for rotating and tilting printhead 6, FIG. 1, in order to effect selection of the particular character corresponding to the key depressed.

Movement of the latch interposers in printer 1 also result in closure of a number of transmitting contacts designated R–1, R–2, R–2*a*, R–5, T1, T2, Check, and No. 8 at the top of FIG. 6*b*. The transmitting contacts supply signals to the recording unit when the apparatus is in a Record mode under control of button 23, FIG. 2.

During a Playback operation when Playback button 24, FIG. 2, is depressed, seven magnets designated R1, R2, R2*a*, R5, T1, T2, and Check are energized in a selective manner to control rotating and tilting of the print head for printing purposes. The R1, R2, R2*a*, and R5 designations relate to four rotate situations for positioning print head 6 and the two designations T1 and T2 relate to the two tilt selection situations for positioning print head 6. Printer 42 has corresponding apparatus. The magnets required for rotating and tilting print head 6 are shown at the bottom of FIG. 6*c*.

As described in the aforementioned patents and manuals each printer 1 and 42 includes an operational selection unit having a number of magnets, each concerned with a particular functional operation. Each printer also includes associated contacts that are selectively closed and opened to indicate the performance of the function required. The operational magnets Upper Case, Lower Case, Space, and Backspace are shown at the bottom of FIG. 6*a* and the operational magnets Tabulate, Index, and Carrier Return are shown lower center, FIG. 6*b*.

Each of the printers 1 and 42 include a number of circuit breaker contacts as follows:

C1—Print Transmitting Contact.
C2—Print Feedback Contact.
C3—Upper Case Contact.
C4—Lower Case Contact.
C5—Tab, Space and Backspace.
C6—Carrier Return.

Also provided are Carrier Return interlock contacts and Tabulate interlock contacts. The various contacts are shown at the bottom of FIG. 6*c*.

NORMAL TYPEWRITING OPERATIONS

As indicated previously, when Split button 22, FIG. 2, is depressed, printer 1 and dictation unit 2 are set up for completely independent operation.

Depression of character keys on keyboard 8 of printer 1 effects selection of characters for printing by print head 6 on document 7 and depression of functional keys affects the performance of the function desired, such as, Carrier Return, Space, etc.

During this mode of operation, printer 1 serves as a normal typewriter for preparing documents and neither supplies nor receives digital signals through control unit 5.

CONTROL UNITS

Each of the control units 5 and 31 includes a complete circuit network such as that shown in FIGS. 6*a*, 6*b*, and 6*c*. Portions of the circuits in FIGS. 6*a*, 6*b*, and 6*c* have already been mentioned in connection with printer 1, including the transmitting contacts R1, R2, R2*a*, R5, T1, T2, Check (CK), and 8, as well as the corresponding rotate and tilt magnets for positioning print head 6, the functional magnets for initiating functions in printer 1 and the circuit breaker contacts C1 through C6.

While the circuits of FIGS. 6*a*, 6*b*, and 6*c* are indicated as being supplied in separate control units 5 and 31, it would be possible to incorporate them in either printer 1 or recorder unit 2, thereby eliminating the necessity for a separate control unit. However, when a transmission system environment involving terminals A and B, FIG. 1, is provided, it is convenient to include the control circuits in separate modules with provision for controlling transmission or local modes of operation as by knob 35, FIG. 3.

Generally, recorder units 2 and 30 and printers 1 and 42 operate with +48 volts potential. The recorder units require a number of different potential levels for energizing transistors T–1, T–2, and T–3, FIG. 4. On the other hand, the SLT logic in FIGS. 6*a*, 6*b*, and 6*c* operates in response to and supplies output signals based on ground (logical zero) and +12 volt (logical 1) levels.

The circuits of FIGS 6*a*, 6*b*, and 6*c* are developed by use of solid logic technology (SLT) blocks that are designated by abbreviations indicated in the section listing abbreviations given previously.

In addition to fairly well known circuit blocks such as single shot (SS) trigger (TR) and latches (L), the circuitry includes logical blocks that are discussed in greater detail below.

And-Or Inverter (AOI).—This is a basic circuit that supplies a 0 output with all inputs at a 1 level for the And function. If any of the inputs is at a 0 level, the output is a logical 1, thereby serving as an Or function. When only a single input and single output are utilized, the output will always be the inverse of the input, thereby serving as an Inverter.

And-Or Extender (AOX).—The AOX block simply provides additional diode inputs to increase the logical capabilities of a driven logic block.

And-Or Power Inverter (AOPI).—The AOPI block is comparable to the AOI block previously discussed but includes a transistor for powering purposes and increased current flow capabilities.

Direct Coupled Inverter (DCI).—The DCI blocks are inverters that are used in connection with an AOI block. The DCI block has one input. With a logical 1 input, the output will be at a 0 level.

Isolating Inverter (II).—The isolating inverter is used to invert signals from another block such as an AOI block so that the output will be at the same logical level as the input to the AOI block.

Converter Circuit (CC).—The converter circuit is used to convert +48 volt levels to SLT levels. A +48 volt input provides a 0 level output. A ground level at the input provides a logical 1 (+12 volts) output.

Magnet Driver (MD).—The magnet driver circuit includes a number of transistors for driving a relay coil to +48 volts. A number of magnet driver blocks are shown in FIGS 6*a*, 6*b*, and 6*c* for energizing the various magnets in the printer.

In addition to the foregoing logic blocks, FIG. 6*a* includes a Clock multivibrator 60 for supplying clock pulses to drive the various circuits in a timed sequence. A wide range of clock rates can be accommodated in the circuits shown, but in a typical case, Clock multivibrator 60 provides pulses at a one kilocycle (kc.) per second rate.

For additional information concerning solid logic technology (SLT) with logical applications, reference is made to the IBM SLT Manual, Form No. R23–2916, dated 1965.

Besides the foregoing blocks, a group detector 61, FIG. 6*a* serves to supply an output to indicate the termination of a series of pulses representing digital data during recording and playback operations in the apparatus. The circuit has a number of transistors and a capacitor timing network that remains charged so long as impulses are applied to the input of block 61 but which times out at the end of a predetermined interval when pulses are no longer received at the input to supply a logical output to indicate the termination of the series of pulses.

DIGITAL RECORDING AND PLAYBACK CONTROLS

The separate independent operation of printer 1 and recorder unit 2 was indicated as being under control of Split button 22, FIG. 2. Split button 22 operates associated switch contacts **22*a***, FIG. 6*c* and through Converter circuit 62 resets a Record latch 63 and a Playback latch 64 for independent operation. In order to establish circuit connections for recording and playing back digital information with printer 1 and recorder unit 2 operating in a cooperative manner under control of control unit 5, printer 1 has other control buttons designated 23–29, FIG. 2 with associated switch contacts designated **23*a*–29*a***, FIG. 6*c*. The purpose of these buttons and switch contacts is as follows:

Record button 23.—When button 23 is depressed, circuits are established for recording digital data on magnetic belt 47, FIG. 4, representing coded characters of information or functional characters derived during operation of printer 1.

Playback button 24.—Depression of Playback button 24 establishes circuit connections for reading previously recorded digital data on magnetic belt 47, FIG. 4, and for actuating printer 1 to print a document or to perform functions in accordance with the characters read.

Erase—Backspace button 25.—When the apparatus is in a Record mode for recording digital data, depression of button 25 causes recorder unit 2 to erase magnetic belt 47 in a forward direction. When the apparatus is in a Playback mode for playing back digital data from unit 2 or in a Split mode, depression of this button results in backspace operations in recorder unit 2.

Line button 26.—Depression of button 26 when Record button 23 is depressed results in recorder unit 2 going into a reverse operation wherein characters of information are read in a reverse direction until a Carrier Return code is encountered, at which time printer 1 will perform a Carrier Return operation to the next line on document 7. As each character is read, printer 1 is backspaced. However, a Backspace character causes printer 1 to space to maintain synchronism between the printer and recorder unit. An Upper Case or Lower Case character or Stop code operates the Index magnet in printer 1 to cause a dummy cycle. This enables the deletion or correction of an entire line of digital data on magnetic belt 47. When Playback button 24 is depressed, depression of Line button 26 results in movement of belt 47 in a forward direction during which time characters of information are read for recognition and printing by printer 1. Recognition of a Carrier Return code stops the operation.

Word button 27.—Depression of button 27, when Record button 23 is depressed, causes unit 2 to move belt 47 in a reverse direction during which time characters of information are read and recognized by printer 1 in a manner similar to that when Line button 26 is depressed. However, as soon as either a Space code or a Carrier Return code is encountered, movement of belt 47 ceases. This enables correction of a word of information on belt 47. Depression of button 27 in the Playback mode results in playback and printing of one word of information.

Character button 28.—Depression of Character button 28 in a Record mode causes unit 2 to reverse the movement of belt 47 during which a single character is read at which time the operation ceases. The character is not printed out, but printer 1 responds to characters in a manner comparable to its response in a Line or Word operation. This enables correction of a single character on belt 47. Depression of Character button 28 when the apparatus is in a Playback mode causes the reading of one character on belt 47 and the printing of the character read by printer 1.

Skip button 29.—In a Playback mode, if the Skip button 29 is depressed prior to depression of Line button 36, Word button 27, or Character button 28, the apparatus is operated to skip over a corresponding amount of information, that is a line, a word, or a character on belt 47 in the forward direction. No skip operation is provided for in a Record mode.

RECORDING DIGITAL DATA-PRINTER TO RECORDER

The flexibility and utility of the apparatus disclosed herein will be apparent by a consideration of the various types of operation that are possible with the apparatus. The primary local operations that are of interest are recording of digital data from printer 1 to recorder unit 2 and the playback of digital data from unit 2 to printer 1. The first operation to be discussed will be the recorder operation in connection with FIG. 9 and the detailed circuits of FIGS. 4, 5, 6*a*, 6*b*, and 6*c*.

Figure 3:
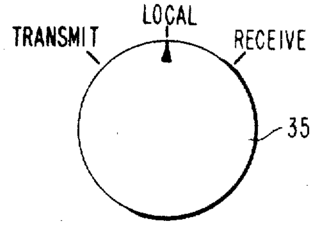
FIG. 3 illustrates a mode control knob for the equipment of FIG. 1.

To establish a Record mode of operation, Record button 23 is depressed, closing contacts **23*a***, FIG. 6*c*. It is assumed at this time that the Transmit-Local-Receive knob 35, FIG. 3, is in a Local position. Closure of contacts **23*a* applies potential through Converter circuit 65 to set Record latch 63 in its on condition. The output of Record latch 63 is applied through magnet driver 66**, FIG. 6*c*, to energize a Record magnet 67. Record magnet 67 has two contacts designated REC–1, FIG. 4, and REC–2, FIG. 5. Record contacts REC–1, FIG. 4, serve to disconnect the normal dictation recording circuits in FIG. 4 from head 46, and to connect, instead, the output of a transistor 68, FIG. 6*a*.

Record contacts REC–2 open the dictation control circuits, FIG. 5. The sequence of operations is illustrated by the waveforms shown in FIG. 9. With Record latch 63 on and relay 67 energized, unit 2 is in a standby mode and awaits reception of signals from printer 1 resulting from depression of a character key or function key.

Characters of information both during recording and playback are entered into a register comprising eight triggers designated TR1–TR8. Initially, triggers TR1–TR8 are reset to their 0 condition by a Record latch input to Single Shot 57 through II block 58 and line 59, FIG. 6*b*.

Subsequently, triggers TR1–TR8 are set to states representing the code combination of the first character supplied as printer 1 cycles in response to depression of a key on keyboard 8.

As a result of the cycling of printer 1, the transmitting contacts R1, R2, **R2*a*, R5, T1, T2, Check (CK) and No. 8 close and applying setting potential through associated Converter circuits designated 80–87** at the top of FIG. 6*b* and through similarly associated AOI blocks designated 90–97. Triggers TR1–TR8 are set when circuit breaker C1 closes by a set pulse on line 72 to AOI 70 and II 71, FIG. 6*b*. Triggers TR1–TR8 are thereby set according to the code configuration representative of the character or function selected in printer 1.

About this time, a Not End of Character ($\overline{EOC}$) level from the End of Character trigger 100, FIG. 6*a*, is applied by line 101, FIG. 6*c*, to energize the Forward magnet and actuate the forward clutch mechanism in recording unit 2 by way of line 102, FIG. 6*c*, and FIG. 5.

As printer 1 cycles, contact C1, opens as represented in FIG. 9. A pulse is then applied through AOX block 107, FIG. 6*a*, to initiate operation of Clock multivibrator 60.

For digital recording and playback purposes, the printer code configuration entered into triggers TR1–TH8 is represented by four groups of impulses, each group of which may vary from one to four pulses of digital significance. Typical digital data impulse combinations are shown on the "data to head" line in FIG. 9. In order to develop the four groups of pulses required, triggers TR1–TR8, FIG. 6*b* are divided into four trigger sets, each set comprising two triggers arranged as follows:

Pulse Group 1—TR1 and TR2.
Pulse Group 2—TR3 and TR4.
Pulse Group 3—TR5 and TR6.
Pulse Group 4—TR7 and TR8.

In order to develop the digital impulses required, the four groups of triggers are gated under control of triggers TRA and TRB designated 110 and 111, respectively, FIG. 6*a*, which in turn control AOX blocks 112–115 during sensing of digital data in a reverse direction and AOI blocks 116–119 that are used to gate the trigger groups during normal recording or playback in the forward direction. The gating impulses for group selection are provided by II blocks 120–123, FIG. 6*a*.

Each pulse group whether it comprises 1, 2, 3, or 4 pulses as shown in FIG. 9, is separated from the preceding or succeeding pulse group by an interval of approximately 2 milliseconds that is derived under control of a Group single shot 125, FIG. 6*a*, as will presently be described.

To illustrate the recording of digital data, it will be assumed that the code configuration 00111001 is entered into triggers TR1–TR8. The operation in developing pulses for recording on belt 47 is illustrated by the following chart:

| | Group 1 | | Group 2 | | Group 3 | | Group 4 | |
|---|---|---|---|---|---|---|---|---|
| | R1 | R2 | R2a | R5 | T1 | T2 | CK | 8 |
| Code Setup | 0 | 0 | 1 | 1 | 1 | 0 | 0 | 1 |
| MV Pulse 1 | 0 | 1 | 0 | 0 | 0 | 1 | 1 | 1 |
| MV Pluse 2 | 1 | 0 | | | 1 | 1 | 0 | 0 |
| MV Pluse 3 | 1 | 1 | | | 0 | 0 | | |
| MV Pluse 4 | 0 | 0 | | | | | | |
| Pulses Recorded | 1111 | | 1 | | 111 | | 11 | |

Multivibrator 60 provides a sequence of pulses through AOI block 126 and II block 127 to the magnetic head driver circuit including transistor 68 that is dependent upon the number of impulses required to change the condition of each of the group triggers to a 00 condition. Referring to the illustrative chart above, group 1 triggers R1 and R2 were left at a 00 status with the code set up shown. The A and B triggers 110 and 111 supply outputs to gate AOI block 116 and II block 120. Pulses are provided by multivibrator 60 to AOI block 128 and DCI block 129 and by way of common line 130 to all AOI blocks 116–119 and associated II blocks 120–123. The combination comprising AOI block 116 and II block 120 is first gated on by triggers 110 and 111 to step triggers TR1 and TR2 in combination from a 00 status to another 00 status. As shown in the chart above, this requires four pulses from multivibrator. As soon as triggers TR1 and TR2 reach a 00 status again, an output is provided on line 131 to II block 132 to fire Group single shot 125. Group single shot 125 supplies a degating impulse through II block 133 to turn off multivibrator 60. Considering the other groups 2, 3, and 4 in chart above, a different number of multivibrator pulses is required to achieve a setting of 00 for the respective groups. This results in a variable number of impulses being supplied by multivibrator 60 to transistor 68 for driving head 46 in accordance with the code configuration entered into triggers TR1–TR8.

The gating under control of A and B triggers 110 and 111, FIG. 6*a* is as follows:

| | A | B |
|---|---|---|
| Gate group **1** | 0 | 0 |
| Gate group **2** | 1 | 0 |
| Gate group **3** | 0 | 1 |
| Gate group **4** | 1 | 1 |
| End of Groups | 0 | 0 |

When the A and B triggers 110 and 111 have reached a status of 00 an output is supplied by line 134, FIG. 6*a* to pulse the End of Character trigger 100 thereby degating line 101, FIG. 6*c* and deactivating the Forward clutch magnet and drive in unit 2, FIG. 5.

Other characters received from printer 1 in response to depression of keys on keyboard 8 are recorded on magnetic belt 47, FIG. 4, in a comparable manner as illustrated in FIG. 9.

With the type of operation indicated, the characters will occupy a variable amount of space on belt 47 depending upon the code combination, and the number of impulses developed for each character. As an example, the shortest character having only four pulses, that is, 1111, each pulse separated by approximately two milliseconds, will occupy an interval on belt 47 that requires approximately 12 milli-seconds movement of belt 47. The longest character will have the following configuration:

1111 1111 1111 1111

In this case, the four groups of pulses are also separated by intervals of approximately 2 milliseconds and the total character interval is approximately 24 milliseconds. As shown in the playback and record charts of FIGS. 8 and 9, some extra space exists in connection with each character set which is not occupied by pulses. In a typical situation, approximately 20 milliseconds would exist between individual character pulse sets.

PLAYBACK OF DIGITAL DATA-RECORDER TO PRINTER

In order to playback digital data from unit 2, playback button 24 is depressed, thereby closing contacts 24*a* in FIG. 6*c*. This sets Playback latch 64 thereby energizing Playback relay 140 through Playback magnet driver 141 at the bottom of FIG. 6*c*. Playback relay 140 has a number of contacts designated PBK–1, PBK–2 and PBK–3, shown in FIGS. 4 and 5 for converting operation of recorder unit 2 to a Playback mode.

During the Playback mode, Forward magnet and clutch, FIG. 5, are normally energized by line 102 from FIG. 6*c*. As belt 47 moves past head 46, previously recorded digital impulses are developed in head 46, amplified by transistors T–1 and T–2, FIG. 4, and provided by Playback contact PBK–1, FIG. 4, to AOX block 142, at the top of FIG. 6*a*. The energization of the clutch magnet in unit 2 results from the change in state of the End of Character trigger 100, FIG. 6*a* under control of a single shot impulse provided on the restart line 69, FIGS. 6*b* and 6*a*.

The Playback latch output together with the impulse from line 72, FIG. 6*b*, gates AOI block 74 to set all triggers TR1–TR8 to their 1 state. Reference is made to FIG. 8 for the pulses and waveforms encountered during the Playback operation. The following chart illustrates the sequence of operation to derive a printer compatible character configuration in register TR–TR8 from the previously recorded digital impulses as they are received in AOX block 142, FIG. 6*a*. It will be assumed that the same character that was recorded during the recording operation previously discussed will be the first character recognized by head 46 as shown on the "data from head" line in the playback chart of FIG. 8. The development of pulses is as follows:

| | Group 1 | | Group 2 | | Group 3 | | Group 4 | |
|---|---|---|---|---|---|---|---|---|
| | TR1 | TR2 | TR3 | TR4 | TR5 | TR6 | TR7 | TR8 |
| Reset | 1 | 1 | 1 | 1 | 1 | 1 | 1 | 1 |
| No. of Head Pulses | (4) | | (1) | | (3) | | (2) | |
| Head Pulse 1 | 0 | 0 | 0 | 0 | 0 | 0 | 0 | 0 |
| Head Pulse 2 | 0 | 1 | | | 1 | 0 | 1 | 0 |
| Head Pulse 3 | 1 | 0 | | | 0 | 1 | | |
| Head Pulse 4 | 1 | 1 | | | | | | |
| Complement | 0 | 0 | 1 | 1 | 1 | 0 | 0 | 1 |

The character configuration as originally recorded comprises four groups of pulses with 4 pulses, 1 pulse, 3 pulses, and 2 pulses in the respective groups. Since triggers TR1–TR8 are all reset initially to the logical 1 state, the four groups of triggers will assume different combinations of states as shown in the chart depending upon the number of pulses received for the respective groups during the reading of belt 47 by head 46. The pulses received through AOX block 142 are supplied through AOI block 128 and DCI block 129 and by the common line 130 through the AOI blocks 116–119 and II blocks 120–123 as gated by the A and B triggers 110 and 111 during the reading sequence.

Accordingly, the four groups of triggers shown in the charts will receive a variable number of impulses according to the character configuration recorded on belt 47. The intermediate state of triggers TR–TR8 upon the reception of all pulses comprising the first character combination is as shown in the chart, that is, 11000110. The final states of triggers TR1–TR8 are complemented as shown on the complement line to form the code combination 00111001. This is identical with the original code combination entered for this character in triggers TR1–TR8 as supplied by printer 1 during the Record operation.

Group detector 61, FIG. 6*a*, supplies an impulse to trigger A designated 110 to step the trigger A and trigger B combination for gating the logic required to supply impulses read by head 46 to triggers TR–TR8. Group detector 61 supplies an output at the end of each pulse group series, that is, at the end of 1, 2, 3, or 4 pulses depending upon the length of the group involved. As soon as triggers A and B reach a state in combination that indicates that all pulse groups for this character have been received the End of Character trigger 100 is restored to its On condition. The EOC output from trigger 100 is provided through an AOI block 145, FIG. 6*a*, and AOPI block 146 to initiate a Type operation in printer 1 by an impulse supplied on line 147.

At this time triggers TR1–TR8 are in a static condition with a representation of the character configuration required for printing a character by printer 1 or for performing a functional operation. The outputs of triggers TR1–TR8 are supplied to a number of AOI blocks designated 150–158 that are gated by the AOPI 146 output on line 148. The blocks 151–158 have unmarked inputs from triggers TR1–TR8 representing a variety of code combinations that can be set up as desired for recognition by printer 1 to effect printing of a character under control of magnet drivers 160–166, FIG. 6*c*, or by magnet drivers concerned with the functional operations of Upper Case, Lower Case, Space, Backspace, Tab, Index, which is used for a stop operation, or Carrier Return, designated 170–176 in FIGS. 6*a* and 6*b*.

SPECIAL OPERATIONS

Control buttons 25, 26, 27, 28, and 29, FIG. 2, are provided for additional flexibility in using the apparatus during Record and Playback modes determined by buttons 23 and 24, FIG. 2.

Referring to FIG. 6*c*, an output from Record latch 63 by line 180 serves as one gate to an AOI block 181. With a Not Skip ($\overline{\text{Skip}}$) level on line 182, any input to block 181 by line 183 will set Reverse trigger 184 to engage the Reverse clutch in unit 2, FIG. 5, by line 185. The inputs on line 183 are from an AOI block 186 and are derived when any of the buttons 26, 27, or 28 is depressed to close the Line contacts **26*a*, Word contacts 27*a*, or Character contacts 28*a*** at the top of FIG. 6*c*. Closure of the contacts **26*a*, 27*a*, and 28*a* set respectively associated latches 190, 191, and 192. An output from block 186 through II block 187 forces a Sub-playback mode by setting Playback latch 64. In this mode of operation, characters previously recorded on belt 47 are read in the reverse direction and entered into the triggers TR1–TR8 by appropriate gating of AOX blocks 112–115**, FIG. 6*a* under control of the A and B triggers 110 and 111. Since the characters are being read in a reverse direction, the entry into triggers TR1–TR8 of necessity must be in an opposite manner in order to derive the proper final code combinations in the triggers for recognition by the circuits.

As each character is read, printer 1 remains synchronized with recorder unit 2. Printer 1 is backspaced through Backspace magnet driver 173, FIG. 6*a*. If a Backspace code is read, however, printer 1 performs a space operation to maintain synchronism. An Upper Case, Lower Case or Stop code energizes the Index magnet to operate printer 1 through a blank cycle to obtain circuit breaker impulses.

During reverse playback, printing of characters is prevented by degating magnet drivers 160–166 under control of AOI 158 and DCI 220, FIG. 6*c*.

If Line latch 190 has been set, a Carrier Return code recognition through AOX 200 will fire the Reset Character Word, or Line single shot (R CWL SS) which then through AOI 201 resets latch 190. If Word latch 191 was set both AOX 200 and AOX 202 are gated so that either a Carrier Return code or a Space code is recognized to fire the Reset single shot to supply an output through AOI 201 for resetting Word latch 191. If Character latch 192 was set, AOX block 203 is gated and a Type signal into AOX block 203 will fire Reset single shot 205, thereupon providing an output from AOI block 201 to reset Character latch 192.

In any of the situations just described, Playback latch 64 will be reset by an impulse on line 206 concurrently with the resetting of the latches 190, 191, and 192. During this entire interval, Record latch 63 remains in a set condition and becomes effective to establish the proper record circuits as soon as the Sub-playback mode of operation has ended. The Reverse trigger 184 is also reset by any output from AOI block 201.

Depression of button 24, FIG. 2, closes contacts **24*a***, FIG. 6*c*, to set Playback latch 64. Also, depression of any of the Line, Word, or Character buttons 26, 27, or 28 will effect the setting or Playback latch 64, FIG. 6*c*, through AOI block 186 and II block 187. In this case, the Reverse trigger 184 will not be set on since AOI 181 is not gated by line 180 from Record latch 63. Therefore, the recording unit will proceed in a forward direction under control of potential on line 102, FIG. 6*c*, and FIG. 5, for reading previously recorded characters from belt 47. The Line, Word, and Character latches 190, 191 and 192 are reset upon recognition of the appropriate characters in a manner similar to that described in the Sub-playback mode.

As previously indicated, depression of the Index button on printer 1 supplies a Stop code configuration for recording on belt 47 which can be recognized later to stop a Playback operation. Stop codes can be inserted throughout the material recorded to separate the material into sections of convenient size and for controlling playback of the information to printer 1.

When in a Playback mde, a Stop character configuration activates AOI block 156, FIG. 6*b*, and supplies a Stop code output on line 159. This is applied in FIG. 6*c* to an AOX block 210 which supplies an impulse directly to AOI block 201 for resetting Playback latch 64.

Depression of Skip button 29, FIG. 2, closes contacts 29*a* at the top of FIG. 6*c* and sets the Skip latch 211. The Skip operation is effective only during a Playback mode and if one of the Line, Word, or Character buttons 26, 27, or 28 is depressed following the depression of Skip button 29, the corresponding amount of information, that is a line, word, or character, is skipped as the apparatus operates in the forward direction.

Characters read during skipping energizes the Index magnet driver to operate the printer through blank cycles. This is useful when it is desired to skip certain information previously recorded on belt 47 when the operator of the equipment wishes to make a deletion. The Reverse trigger 184 is degated since line 182, the Not Skip line, is inactive at this time. The inadvertent skipping of portions of the belt during a Record mode is also prevented.

In connection with the Record operation illustrated in FIG. 9 and the Playback operation in FIG. 8, circuit breaker C1 is primarily effective to control the Record operation, while circuit breaker C2 is effective to control the playback operation.

In summary, the various controls provided herein facilitate the correction, addition, or deletion of material in printed documents as well as the flexible use of the digital data recorded on the record media in unit 2. The Line, Word, and Character buttons enable the recognition of appropriate amounts of information in either a forward or reverse direction on the magnetic belt in unit 2 with printing being controlled under appropriate circumstances by the mode of operation, that is, whether the apparatus is in a Record or Playback mode, and also under control of the Skip button.

COMMUNICATION ASPECTS

Added versatility of the apparatus disclosed herein is realized in a communicating environment with the addition of appropriate circuitry and other elements including the data subsets 33 and 34, FIG. 1. It is assumed that digital data is supplied directly by printer 1, or from unit 2 as a result of a previous recording operation. To transmit information from terminal A to terminal B, terminal A calls terminal B through the subsets 33 and 34. Knob 35 is then set to a Transmit position and knob 6 to a Receive position.

For purposes of illustration, it is assumed that six bit characters are used in the communications network rather than the seven or eight bit characters previously indicated. During transmission of information with six bit characters, the characters are transferred from unit 2, as an example, or printer 1, to register 37 in control unit 5. The characters are supplied by transmission lines 32 to register 39 in control unit 31 for subsequent recording in recorder 30 or printing by printer 42. To illustrate the transmission process, it will be assumed that the individual characters comprise two sets of pulses of three bits each. A number of pulses which is the decimal equivalent of the coded configuration is transmitted instead of the actual bit configuration of the character in a manner somewhat comparable to that described previously in connection with the local recording and playback operation.

Each character transmitted over line 32, therefore, consists of a first series of pulses and a second series of pulses separated by a short time interval. Longer time intervals separate the individual character pulse sets.

Transmission and receipt of a typical character is set forth in the table below.

| | Serialize | Pulses Transmitted And Received | Deserialize |
|---|---|---|---|
| A. Character Entered | 100 001 | | 111 111 |
| B. Transmit First Three Bit Group: | | | |
| MV pulse | 010 001 | 1 | 000 111 |
| Do | 110 001 | 1 | 100 111 |
| Do | 001 001 | 1 | 010 111 |
| Do | 101 001 | 1 | 110 111 |
| Do | 011 001 | 1 | 001 111 |
| Do | 111 001 | 1 | 101 111 |
| Do | 000 001 | 1 | 011 111 |
| C. Transmit Second Three Bit Group: | | | |
| MV pulse | 000 101 | 1 | 011 000 |
| Do | 000 011 | 1 | 011 100 |
| Do | 000 111 | 1 | 011 010 |
| Do | 000 000 | 1 | 011 110 |
| D. Invert Received Character for Typing | | | 100 001 |

Register 37 is stepped under control of multivibrator 38. Section B of the table shows that a number of pulses is supplied to the first three bit section of register 37 in order to step this section of the register to a 000 status. While the stepping of this portion of register 37 takes place, a corresponding number of pulses is transmitted over line 32 to register 39 for assembly. Initially, in control unit 31, all bit positions in register 39 are set to the 1 state. The first group of pulses transmitted over line 32 are directed to the first section of register 39 to step it from its initial condition of 111. The net result is to change the state of the first portion of register 39 to a condition which will represent the number of pulses transmitted in the first group from register 37 over line 32.

Following the transmission of the first three bit group of the first character, the pulses from multivibrator 38 are directed to the second section of register 37 in order to step it to a count status of 000. In the assumed case, in the table given, this requires four pulses from multivibrator 38.

At the receiving terminal B, the four pulses sent as a result of the stepping of the second section of register 37 are directed to the second section of register 39. If the second section of register 39 is stepped four times it will have a status of 110.

Prior to print out or recording of the character accumulated in register 39 at terminal B, the code configuration developed is complemented. In the assumed case with a 011110 configuration in register 39, the complemented outputs will be 100001 which is the same configuration as that of the character originally entered in register 37.

The operation of terminal B including printer 42, recorder unit 30 and control unit 31 occurs in a manner comparable to the equipment at terminal A, and transmission of data from terminal B to terminal A can be handled in a comparable fashion by reversing the setting of knobs 35 and 36, FIG. 1.

SYNOPSIS

The apparatus provided according to the present inventive arrangements provides considerable flexibility in office operations. The equipment can be used independently or in combination for accomplishing a large number of operations in an office or communicating environment. Each unit involved in the configurations discussed herein retains its full capabilities for normal office operations such as typing or dictation, but by the addition of a few simplified circuit arrangements the units are capable of complex operations far in excess of their normal capabilities.

With the unique arrangements disclosed herein, digital data is handled either locally or in a communicating environment in a rapid but simplified manner and the amount or complexity of equipment required to perform these various operations is kept to a minimum without sacrificing speed or accuracy of operation.

The novel arrangements described represent a new approach to multiple purpose apparatus making use of standardized readily available components.

While the invention has been particularly shown and described with reference to several embodiments, it will be understood by those skilled in the art that various changes in form and detail may be made without departing from the spirit and scope of the invention.

What is claimed is:

1. Data processing apparatus comprising:

a record media processing unit including drive means for driving a record media in a first direction and a second direction;

means for recording digital signals on a record media in said media processing unit, said signals being arranged in data unit types, each data unit type having a plurality of at least one distinctive first indication representative of that type, said first indication preceding said data unit type, and further having at least a second distinctive indication representative of that type, said second indication terminating said data unit type;

means for selecting one of said plurality of data unit types;

and control means responsive to said selecting means and said indications and including first means for establishing a first mode of operation to control said media processing unit to scan, reproduce, and terminate scanning of a selected data unit type upon recognition of said terminating indication in said first direction when said apparatus is in said first mode of operaton and including second means for establishing a second mode of operation to control said media processing unit to scan, reproduce, and terminate scanning of a selected data unit type upon recognition of said preceding indication in said second direction when said apparatus is in said second mode of operation.

2. The apparatus of claim 1, further comprising:

character selection means for selecting data unit types on a character-by-character basis; and means responsive to said character selection means for cycling said media processing unit through character cycles to scan and reproduce individual characters of information.

3. The apparatus of claim 1, further comprising:

means for skipping a selected data unit type during either mode of operation.

4. The apparatus of claim 1, further comprising:

means operable in said first mode of operation to direct said reproduced information to an output device and means operable in said second mode of operation to normally record information and to sense said reproduced information for positioning said record media for editing and correction purposes.

5. Recording apparatus comprising:

a record unit including drive means for driving a record media in a first direction and a second direction;

means for generating digital signals arranged in data unit types of information, each data unit type being identified by a recognizable indication uniquely representative of that type;

means for establishing a first mode of operation to activate said drive means to drive said media in said first direction and to concurrently record signals supplied by said digital generating means on said media;

means for establishing a second mode of operation to activate said drive means to drive said media in said first direction to read signals previously recorded on said record media;

means for selecting a particular data unit type;

control means responsive to said selecting means and including conditioning means for conditioning said first mode means to interrupt drive of said media in said first direction and recording of signals and to control said recorder unit to scan and reproduce a selected data unit type of information in said second direction when said apparatus is in said first mode and including further means for controlling said recorder unit to scan and reproduce a selected data unit type of information in the first direction when said apparatus is in said second mode.

6. The apparatus of claim 5, further comprising:

means operable during said first mode of operation to scan and reproduce a data unit in a pseudo-Playback mode in which data is scanned only to position said record media at a desired location, and otherwise not utilized.

7. The apparatus of claim 5, further comprising:

means responsive to recognition of the selected data unit type indication for stopping a scanning and reproducing operation.

8. The apparatus of claim 5, further comprising:

operator controlled means for establishing said modes of operation and selecting data unit types.

9. The apparatus of claim 5, further comprising:

means for skipping a selected data unit type in either mode of operation.

10. The apparatus of claim 9, further comprising:

means for rendering said skipping means effective during only one of said modes of operation.

11. The apparatus of claim 5, further comprising:

printing means responsive to reproduced signals for producing printed copy.

12. The apparatus of claim 11, further comprising:

means for conditioning said printing means for response to reproduced signals to produce printed copy only in one of said modes of operation.

13. The apparatus of claim 12, further comprising:

additional means for conditioning said printer for response in a normal manner to print and perform functions in said one mode of operation, and to convert selected codes in the other mode of operation in order to maintain synchronism between printer location and media location.

14. The apparatus of claim 13, further comprising:

means for converting Space codes to Backspace codes during said other mode of operation.

15. The apparatus of claim 14, further comprising:

blank cycle means for conditioning said printer to ignore certain codes such as upper case, lower case or Stop codes during said other mode of operation and instead to cycle through a blank cycle.

16. Recording apparatus comprising:

a recorder unit for recording and reproducing signals on a record media, said unit including drive means to drive said media in a forward direction and a reverse direction;

a printer;

key controlled means for actuating said printer to print a plurality of variable length blocks of information, with each said block being identified by unique respectively associated charcater indications;

means in said printer for supplying coded signals representative in combination of a character printed or an operational function performed;

means in said printer responsive to externally supplied signals for printing and for performing printer operations;

control means interconnecting said printer and said recorder unit;

operator controlled means for establishing a Record mode of operation to activate said drive means to drive said media in a forward direction and to concurrently record signals supplied by said printer on said record media;

operator controlled means for establishing a Playback mode of operation to activate said drive means to drive said media in a forward direction to reproduce previously recorded signals and to provide said reproduced signals to said printer for actuating the same;

means for selecting a particular block of information;

and block control means responsive to said selecting means and including conditioning means for conditioning said Record mode means to interrupt drive of said media in said forward direction and recording of signals and to control said recorder unit to scan and reproduce a particular selected block of information in the reverse direction when said apparatus is in a Record mode and including further means for controlling said recorder unit to scan and reproduce a particular selected block of information in the forward direction when said apparatus is in a Playback mode.

17. Recording apparatus comprising:

a recorder unit, said unit having a transducer and means mounting a record media for relative driving movement with respect to said transducer in forward and reverse directions for recording and reproducing signals on said media;

a printer, said printer having a printing means and adjacently positioned document supporting means;

key controlled means for actuating said printer to print line, word, and character blocks of information on a supported document and for controlling operational means in said printer, with the information blocks being identified by line return, space and printer cycle indications, respectively;

means in said printer for supplying digital signals representative in combination of a character printed and an operational function performed;

means in said printer responsive to externally supplied signals for actuating said printing means to print characters and for actuating said printer operational means;

control means interconnecting said printer and said recorder unit;

operator controlled means for establishing a Record mode of operation to relatively drive said record media and said transducer in a forward direction and to concurrently record signals supplied by said printer on said record media;

operator controlled means for establishing a Playback mode of operation to relatively drive said record media and said transducer in a forward direction to reproduce previously recorded signals and supply said signals to said printer for actuating the same;

and line, word, and character means including conditioning means for conditioning said Record mode means to interrupt drive of said media in said forward direction and recording of signals and to control said recorder unit to selectively scan and reproduce a line, word, or character, respectively, in the reverse direction when said apparatus is in a Record mode and including further means for controlling said recorder unit to selectively scan and reproduce a line, word, or character of information in the forward direction when said apparatus is in a Playback mode.

References Cited

UNITED STATES PATENTS

| | | | |
|---|---|---|---|
| 3,260,340 | 7/1966 | Locklar et al. | 197—19 |
| 2,297,789 | 10/1942 | Mills et al. | |
| 2,901,734 | 8/1959 | Welsh et al. | |
| 2,976,372 | 3/1961 | Sampson. | |

PAUL J. HENON, Primary Examiner

P. R. WOODS, Assistant Examiner

U.S. Cl. X.R.

340—174.1